United States Patent
Maloney

(10) Patent No.: US 7,654,745 B2
(45) Date of Patent: Feb. 2, 2010

(54) CLINCH SPOT BEARING

(75) Inventor: Michael J. Maloney, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 150 days.

(21) Appl. No.: 11/683,049

(22) Filed: Mar. 7, 2007

(65) Prior Publication Data

US 2007/0253658 A1  Nov. 1, 2007

Related U.S. Application Data

(60) Provisional application No. 60/745,897, filed on Apr. 28, 2006.

(51) Int. Cl.
*F16C 17/00* (2006.01)
*F16C 43/00* (2006.01)

(52) U.S. Cl. .................. 384/439; 384/518; 384/537; 403/163

(58) Field of Classification Search .......... 384/490, 384/510, 517, 518, 537, 295, 428, 439, 440, 384/441; 403/161, 162, 163, 166, 279–283
See application file for complete search history.

(56) References Cited

U.S. PATENT DOCUMENTS

| | | | | |
|---|---|---|---|---|
| 2,617,691 A | * | 11/1952 | Bechler | 403/23 |
| 3,318,169 A | * | 5/1967 | Tronslien | 74/432 |
| 4,125,298 A | * | 11/1978 | Heurich et al. | 384/537 |
| 4,582,435 A | | 4/1986 | Davis | |
| 5,692,305 A | * | 12/1997 | Roskam | 30/254 |
| 5,860,780 A | | 1/1999 | Lenac et al. | |
| 6,666,583 B2 | * | 12/2003 | Nieman et al. | 384/537 |

* cited by examiner

*Primary Examiner*—William C Joyce
(74) *Attorney, Agent, or Firm*—Gregory J. Gore & Associates

(57) ABSTRACT

The rotatable joinder of two sheets is provided by a two-piece interfitting bearing assembly with each element separately attached to one of the sheets so that the sheets are joined but rotation is controlled by the interfitting bearing surfaces. The interfitting parts comprise an inner and outer race which are placed together in superposition with aligned apertures in the sheets. The rotatable attachment of the sheets is accomplished in a single pressing operation in which each race is simultaneously pressed into one of the sheets with a gap remaining between them.

5 Claims, 2 Drawing Sheets

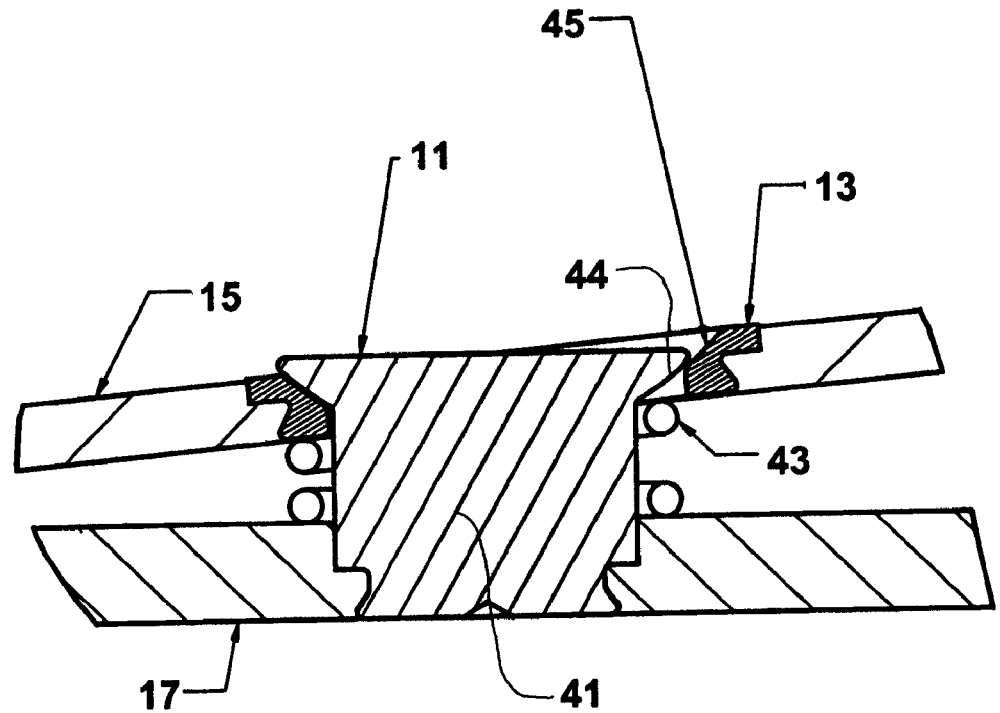
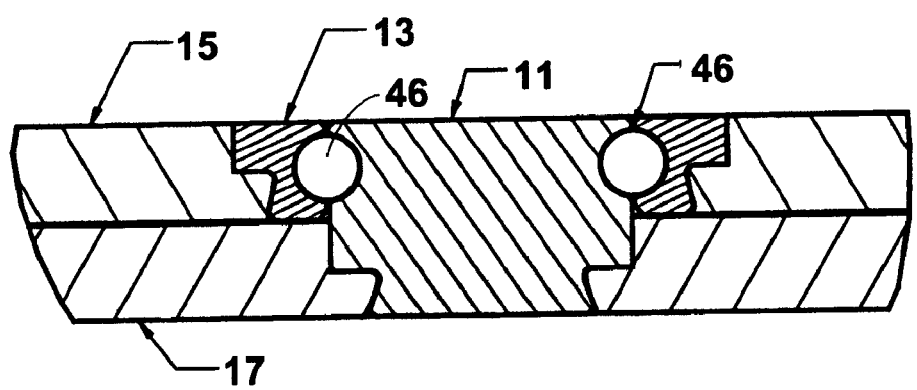

CLINCH SPOT BEARING

RELATED APPLICATION

This patent application is related to provisional patent application Ser. No. 60/745,897 entitled "Clinch Spot Bearing" filed on Apr. 28, 2006, priority from which is hereby claimed.

FIELD OF THE INVENTION

The present invention relates to a fastener for joining two sheets of material which also permits relative rotation between them. More specifically, it relates to a clinch-type two-part fastener which provides the rotatable joinder of two sheets in a single pressing assembly operation.

BACKGROUND OF THE INVENTION

There is recognized in the fastening arts the need for a fastener which will rotatably join two relatively thin sheets of metal. These fasteners are often referred to as pivot bearings or thrust bearings. Examples of such structures are shown for example in U.S. Pat. No. 4,582,435 issued to Davis entitled "Pivot Bearing." Another such device is described in U.S. Pat. No. 5,860,780 issued to Lenac et al. In both cases, a riveting type process is used to flare over either one of the material sheets or a rivet type fastener as depicted in the patent to Lenac et al. Each of these systems has their disadvantages which include the inability to provide a resilient separation between the sheets or to accommodate axial deflection without impairing the relative rotation between the sheets. Furthermore, installation of the Lenac fastener into the sheets can be complicated. Also, in both of these instances, one of the bearing surfaces is necessarily the sheet material itself. This can result in excessive wear, maintenance problems, and failure of the joint. It also limits the sheet material and its surface condition. Joint assemblies which solve this problem are more complicated, three-component systems.

There is therefore a need in the art to join two sheets of relatively thin sheet metal while allowing rotation between them in a manner which is efficient and economical and which also allows for axial deflection and resilient separation between the sheets. There is also a need in the art for a simplified rotatable joint assembly for thin metal sheets in which neither of the sheets is required to be a frictional bearing surface.

SUMMARY OF THE INVENTION

In order to meet the needs in the art described above, the present invention permits rotatable joinder of two sheets by providing a two-piece interfitting bearing assembly with the individual elements rigidly attached to each sheet so that the sheets are joined but rotation is controlled by the interfitting bearing surfaces. The two interfitting parts comprise an inner and outer race which may be placed together in superposition with aligned apertures in the sheets to be joined before the race pair is pressed into the sheets in a single pressing operation. Material for the bearing components may be selected for the friction and load characteristics of the specific application. Alternate embodiments include adding ball bearings between the races or in another case utilizing a biasing spring between the sheets with arcuate bearing surfaces which permits the sheets to rotate and/or deflect angularly.

More specifically, the present invention comprises a bearing assembly for rotatably joining two sheets, a top sheet having a first aperture aligned with a bottom sheet in face-to-face relation with the bottom sheet having a second aperture in alignment with the first aperture about an axis. An outer race resides within the aperture of the top sheet and has a bore in the center and means around its circumference for receiving a cold flow of metal from the top sheet to rigidly attach it. An inner race lies partially within the outer race and partially within the second sheet, secured thereto by circumferential clinch attachment means. The inner race further includes a head of increased diameter greater than the diameter of the outer race bore thereby captivating the top sheet to the bottom sheet after assembly. The inner race and the outer race are closely dimensioned to provide the joinder and rotatability of one sheet relative to the other about the axis.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a side sectional view of an alternate embodiment thereof using a spring separator and arcuate bearing surfaces.

FIG. 4 is a side sectional view of an alternate embodiment showing the use of ball bearings.

DESCRIPTION OF THE PREFERRED EMBODIMENT

Figure 1:
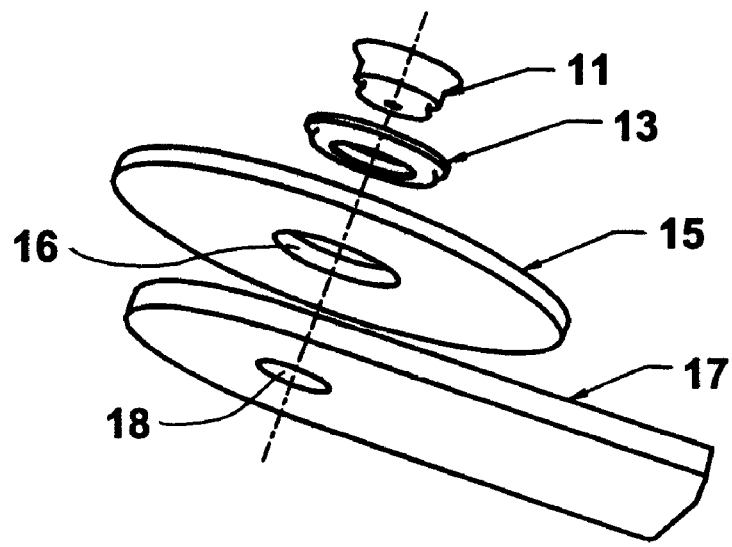
FIG. 1 is a bottom right isometric assembly view of the invention.
Figure 2A:
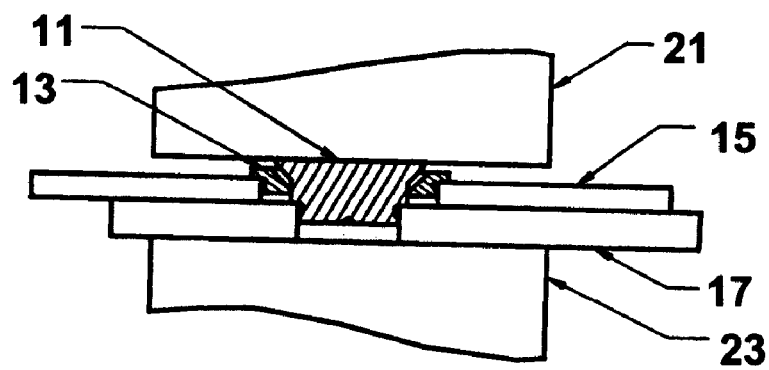
FIGS. 2A and 2B are sequential side sectional views showing the assembly of the invention.
Figure 2B:
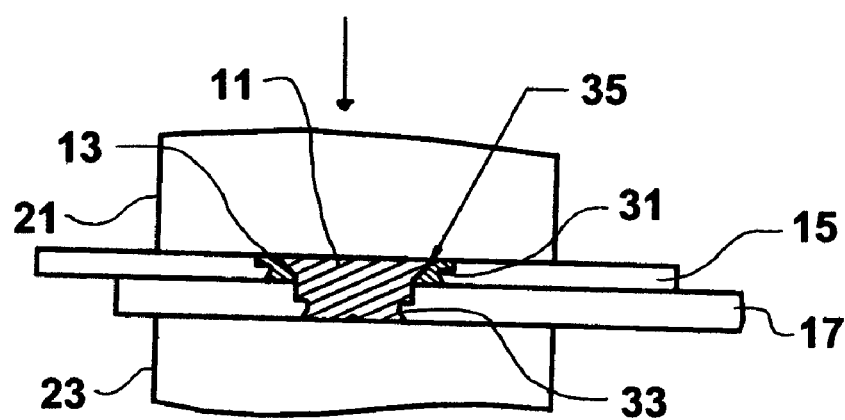

Referring now to FIG. 1, the basic four elements of the present invention are shown. Inner race 11 and outer race 13 are assembled into sheets 15 and 17 such that they become joined yet freely rotatable upon bearing elements 11 and 13. Element 11 is an inner race which is interfitted within outer race 13. In a single pressing operation as depicted in FIGS. 2A and 2B, inner race 11 is installed into the bottom sheet 17 as outer race 13 is clinched into top sheet 15. Installation of the races is achieved through aligned apertures 16 and 18 in the top and bottom sheets respectively.

Referring now to FIGS. 2A and 2B, assemblage of the components of the invention is illustrated by a pressing operation carried out between punch 21 and anvil 23. Top and bottom sheets 15 and 17 are placed in the press with their apertures aligned. Inner race 11 and outer race 13 are placed together and set onto the sheets in axial alignment with the sheet apertures as shown in FIG. 2A. Pressing is then performed which results in the joinder of the sheets and the clinching of parts as depicted in FIG. 2B. A circumferential undercut 31 around the perimeter of the outer race receives the cold flow of metal from the top sheet while a similar circumferential undercut 33 on the inner race receives the cold flow of metal from the bottom sheet due to the pressure of these parts into the sheet material. This achieves the rigid affixation of the outer race to the top sheet and the inner race to the bottom sheet. The parts are sized to create a gap or clearance 35 to control the relative movement between the parts and to permit their free rotation.

Referring now to FIG. 3, an embodiment of the invention utilizes an inner race 11 having an elongated shank portion 41 which permits a substantial standoff distance between sheets 15 and 17. The inner race 11 and outer race 13 are clinched into the top and bottom sheets in the same manner as shown in the embodiment of FIGS. 2A and 2B but a spring 43 is employed around the shank 41 of the inner race. The spring resiliently biases the sheets apart while permitting their angular deflection as shown in this figure. This embodiment permits a rocking motion as well as a rotary motion between the parts. To facilitate the angular deflection, compatible arcuate surfaces 44 and 45 on the inner and outer races respectively are employed. This embodiment provides a ball-and-socket style flush clinch bearing but requires a two-step pressing operation for installation. The outer race is pressed into the sheet first and then the inner race is installed through the top sheet and spring, being clinched into the second sheet with a second pressing operation.

Referring now to FIG. 4, yet another embodiment rotatably joins sheets 15 and 17 in which the inner and outer races 11 and 13 employ ball bearings 46 to reduce friction. A further reduction of friction may be obtained by utilizing a shim (not shown) between the sheets during installation which when later removed ensures that the sheets will be maintained in a non-contacting relationship as they rotate.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bearing assembly for rotatably joining two sheets, comprising:

a planar top sheet having a first aperture;

an outer race located within said first aperture and having an axial bore and means receiving a cold flow of metal from the top sheet rigidly attaching it thereto;

a bottom sheet in face-to-face relation with said top sheet and having a second aperture in axial alignment with said first aperture about an axis;

a unitary inner race partly located within said axial bore of said outer race and extending axially at least to a point partially within said second aperture, said inner race having circumferential clinch attachment means receiving a cold flow of metal from said bottom sheet rigidly securing it to said bottom sheet; and wherein said inner race has a head of increased diameter greater than the diameter of said outer race bore thereby captivating the top sheet to the bottom sheet, said inner race and outer race being closely dimensioned to rotatably join the top sheet to said bottom sheet about said axis.

2. The bearing assembly of claim 1 wherein the head of said inner race includes an angled outer sidewall.

3. The bearing assembly of claim 2 wherein said outer race includes an angled inner sidewall for closely receiving the outer sidewall of said head.

4. The bearing assembly of claim 3 further including a spring encircling a shank portion of said inner race between said top and bottom sheets and being in abutment with said sheets at each end of said spring resiliently biasing said sheets apart.

5. The bearing assembly of claim 1 wherein the head of the inner race is flush with a top surface of the top sheet and opposite end of the inner race is flush with a bottom surface of the bottom sheet.

\* \* \* \* \*